US007230347B2

(12) United States Patent
Brown et al.

(10) Patent No.: US 7,230,347 B2
(45) Date of Patent: Jun. 12, 2007

(54) CORROSION PROTECTION FOR WIND TURBINE UNITS IN A MARINE ENVIRONMENT

(75) Inventors: Douglas Alan Brown, Houston, TX (US); Rebecca E. Hefner, Greenville, SC (US)

(73) Assignee: General Electric Company, Schenectady, NY (US)

( * ) Notice: Subject to any disclaimer, the term of this patent is extended or adjusted under 35 U.S.C. 154(b) by 31 days.

(21) Appl. No.: 11/250,724

(22) Filed: Oct. 14, 2005

(65) Prior Publication Data

US 2007/0085345 A1 Apr. 19, 2007

(51) Int. Cl.
*F03B 63/00* (2006.01)

(52) U.S. Cl. ............................ 290/55; 290/44; 290/43; 290/40 F; 290/54

(58) Field of Classification Search .................. 290/55, 290/44, 43, 40 F, 54
See application file for complete search history.

(56) References Cited

U.S. PATENT DOCUMENTS 3,922,739 A * 12/1975 Babintsev .................... 441/16
4,224,527 A * 9/1980 Thompson .................. 290/54
4,941,775 A * 7/1990 Benedict ..................... 405/216
5,510,656 A * 4/1996 Wells ......................... 290/53
5,609,748 A * 3/1997 Kotowski et al. ........... 205/734
6,231,967 B1 * 5/2001 Neukirchen ................. 428/332
6,419,816 B1 * 7/2002 Lyublinski .................. 205/734
6,766,643 B2 * 7/2004 Christensen ................. 60/398
6,774,814 B2 * 8/2004 Hilleary ................. 340/870.07
6,822,432 B2 * 11/2004 Hilleary ....................... 324/72
6,827,032 B1 * 12/2004 Wobben .................. 114/230.1
6,971,820 B2 * 12/2005 Rossabi et al. ........ 405/128.15

* cited by examiner

*Primary Examiner*—Darren Bohuberg
*Assistant Examiner*—Iraj A. Mohandesi
(74) *Attorney, Agent, or Firm*—James E. McGinness, Esq.; Armstrong Teasdale LLP

(57) ABSTRACT

A corrosion protected wind turbine unit includes a wind turbine unit support structure or foundation implanted in water and an impressed current anode electrochemically coupled to the wind turbine unit support structure or foundation through the water. Also included is a controlled current source configured to receive electrical current from the wind turbine unit or at least one other wind turbine unit located in proximity to the corrosion protected wind turbine unit and further configured to operate the impressed current anode.

10 Claims, 5 Drawing Sheets

CORROSION PROTECTION FOR WIND TURBINE UNITS IN A MARINE ENVIRONMENT

BACKGROUND OF THE INVENTION

This invention relates generally to wind turbine energy sources and more particularly to the protection of marine-based wind turbine structures.

Generally, a wind turbine includes a rotor having multiple blades. The rotor is mounted to a housing or nacelle, which is positioned on top of a truss or tubular tower. Utility grade wind turbines (i.e., wind turbines designed to provide electrical power to a utility grid) can have large rotors (e.g., 30 or more meters in diameter). Blades on these rotors transform wind energy into a rotational torque or force that drives one or more generators that may be rotationally coupled to the rotor through a gearbox. The gearbox steps up the inherently low rotational speed of the turbine rotor for the generator to efficiently convert mechanical energy to electrical energy, which is fed into a utility grid.

Some wind turbine units (i.e., the wind turbine itself, the tower, support structure/foundation, auxiliary components, etc.) are installed in water or seawater, and may be installed in shallow, swift current, with shifting bathymetry and perhaps brackish water. It is known that steel structures used for marine facilities corrode, when unprotected, about 5 mils per year. Higher rates of corrosion are also possible, depending upon the composition of the water, imperfections in the steel itself, and many other factors.

To avoid or at least delay the effects of corrosion, some of these known offshore wind turbine unit installations use cathodic protection (CP) to protect wind turbine unit support structures or foundations. This technique involves the use of electrochemical reactions to prevent the corrosion of underwater steel structures. Sacrificial anodes are presently being used in such CP installations. However, if the anodes are buried by shifting bathymetry or tidal changes in water level, if the current is particularly swift, and/or the salinity of the water changes by a significant amount, the protection provided will suffer. For example, the anodes can be consumed prematurely, underprotect the structure, or passivate. Sacrificial anodes cannot adjust to changing conditions and would be subject to premature consumption or to underprotection of the wind turbine unit support structure or foundation. Locations far from the equator also have both a higher chance of annual wind force and a higher chance of higher tides. Variations in water depth of as much as 80 feet can occur due to strong tides, which can change the amount of support structure or foundation that is being corroded, along with current, waves, salinity, and bathymetry changes.

In addition, sacrificial anodes require wasteful over-design and consequential excess weights. The high weights may require the construction of stronger support structures, especially if the anodes are installed as part of the support structure, as is usually the case for platforms or tripods. Since windy offshore sites have a limited/short installation and construction season, cathodic protection sometimes cannot be installed until the next installation season, allowing initial corrosion to occur on the support structures or foundations. Furthermore, hazardous minor metal components are common in sacrificial anodes. These components are released into the surrounding water as the anodes are "sacrificed" (corroded/eroded). Some environmentalists and government bodies are concerned by the effect of this release on the surrounding environment.

In addition, a large amount of energy is consumed for the manufacture of sacrificial anodes, which are typically very heavy. In addition to increased cost, this weight results in increased safety risk both as a result of weight as well as the large number of components that must be installed.

Thus, sacrificial anode CP is not an ideal protection for wind turbine units either in regard to safety and environmental considerations, or in changing ocean conditions.

BRIEF DESCRIPTION OF THE INVENTION

In one aspect, some configurations of the present invention therefore provide a method for protecting a wind turbine unit support structure or foundation from corrosion. The method includes providing an impressed current anode electrochemically coupled to the wind turbine unit support structure or foundation, and applying a current obtained from at least one wind turbine unit on the wind turbine support structure or foundation, or a power supply associated with the at least one wind turbine unit, to the impressed current anode to operate the impressed current anode.

In another aspect, some configurations of the present invention provide a corrosion protected wind turbine unit. The wind turbine unit includes a wind turbine support structure or foundation implanted in water and an impressed current anode electrochemically coupled to the wind turbine support structure or foundation through the water. Also included is a controlled current source configured to receive electrical current from the wind turbine unit, a power supply associated with the wind turbine unit, or at least one other wind turbine unit located in proximity to the corrosion protected wind turbine unit or a power supply associated with the at least one other wind turbine unit, and further configured to operate the impressed current anode.

It will be appreciated that some configurations of the present invention are capable of adapting to changing corrosiveness conditions throughout an expected 20–25 year lifetime of a wind turbine unit, or perhaps longer, and also provide additional advantages as further described below.

DETAILED DESCRIPTION OF THE INVENTION

The word "or," unless conjoining physically exclusive events, components, etc., or unless otherwise explicitly stated, is intended to be interpreted as an "inclusive" or. Thus, "a controlled current source configured to receive electrical current from the wind turbine unit, a power supply associated with the wind turbine unit, or at least one other wind turbine unit located in proximity to the corrosion protected wind turbine unit or a power supply associated with the at least one other wind turbine unit," for example, is intended to include within its scope, a controlled current source configured to receive power from any one or more of the wind turbine unit, a power supply associated with the wind turbine unit, at least one other wind turbine unit located in proximity to the corrosion protected wind turbine unit, and a power supply associated with the at least one other wind turbine unit.

In some configurations of the present invention, an impressed current cathodic protection (ICCP) system is provided to protect one or more offshore wind turbine unit support structures or foundations. The wind turbine units generate their own power, some of which is provided to the ICCP system. Also in some configurations, wind turbine unit support structures or foundations are located in shallow water, which keeps anode cable lengths short and economical. A controller system that is already part of a wind turbine system is programmed to monitor the health of the ICCP system.

Figure 1:
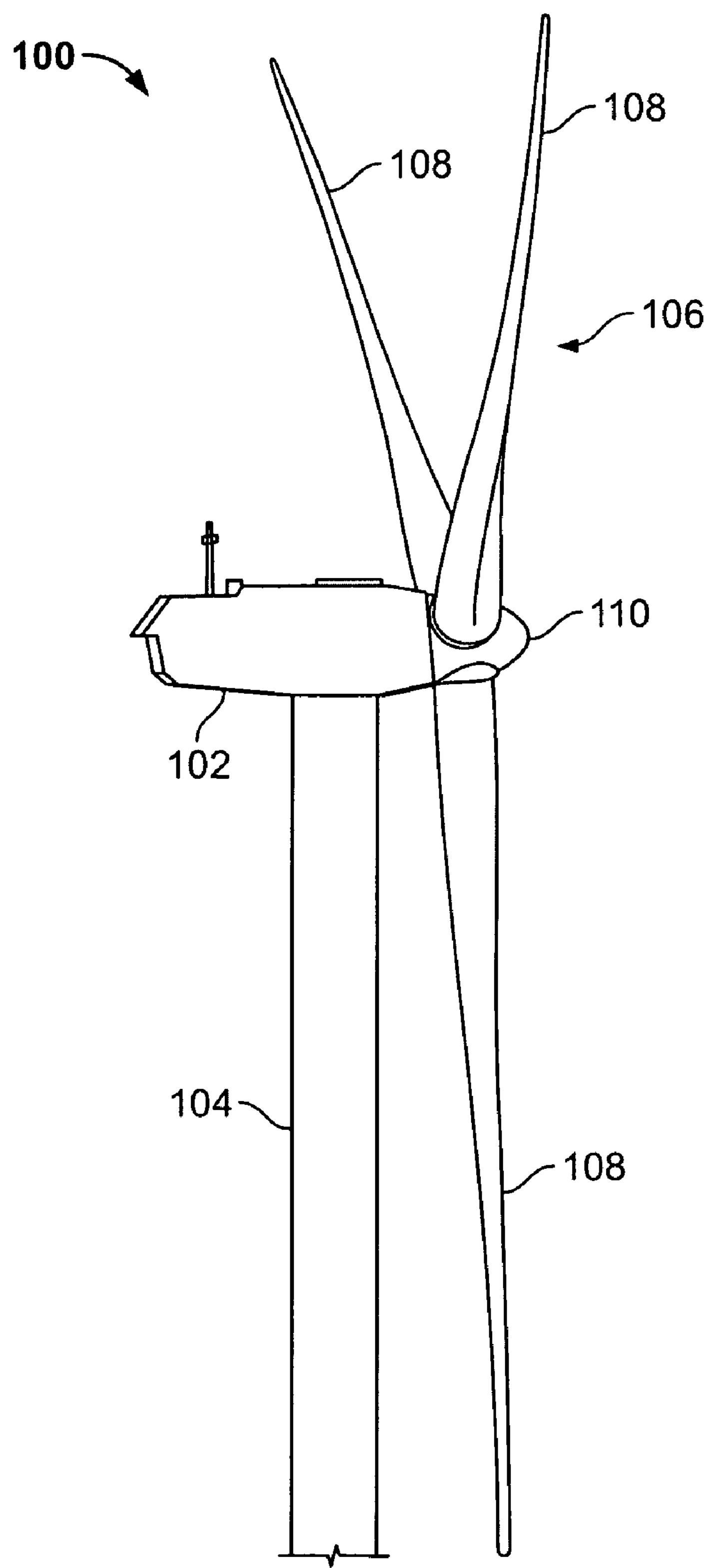
FIG. 1 is a drawing of a representative configuration of a wind turbine unit.

In some configurations and referring to FIG. 1, a wind turbine unit 100 comprises a nacelle 102 housing a generator (not shown in FIG. 1). Nacelle 102 is mounted atop a tall tower 104 on a support structure or foundation (also not shown in FIG. 1). Only a portion of the tall tower is shown in FIG. 1. Wind turbine unit 100 also comprises a rotor 106 that includes one or more rotor blades 108 attached to a rotating hub 110. Although wind turbine unit 100 illustrated in FIG. 1 includes three rotor blades 108, there are no specific limits on the number of rotor blades 108 required by the present invention.

Figure 2:
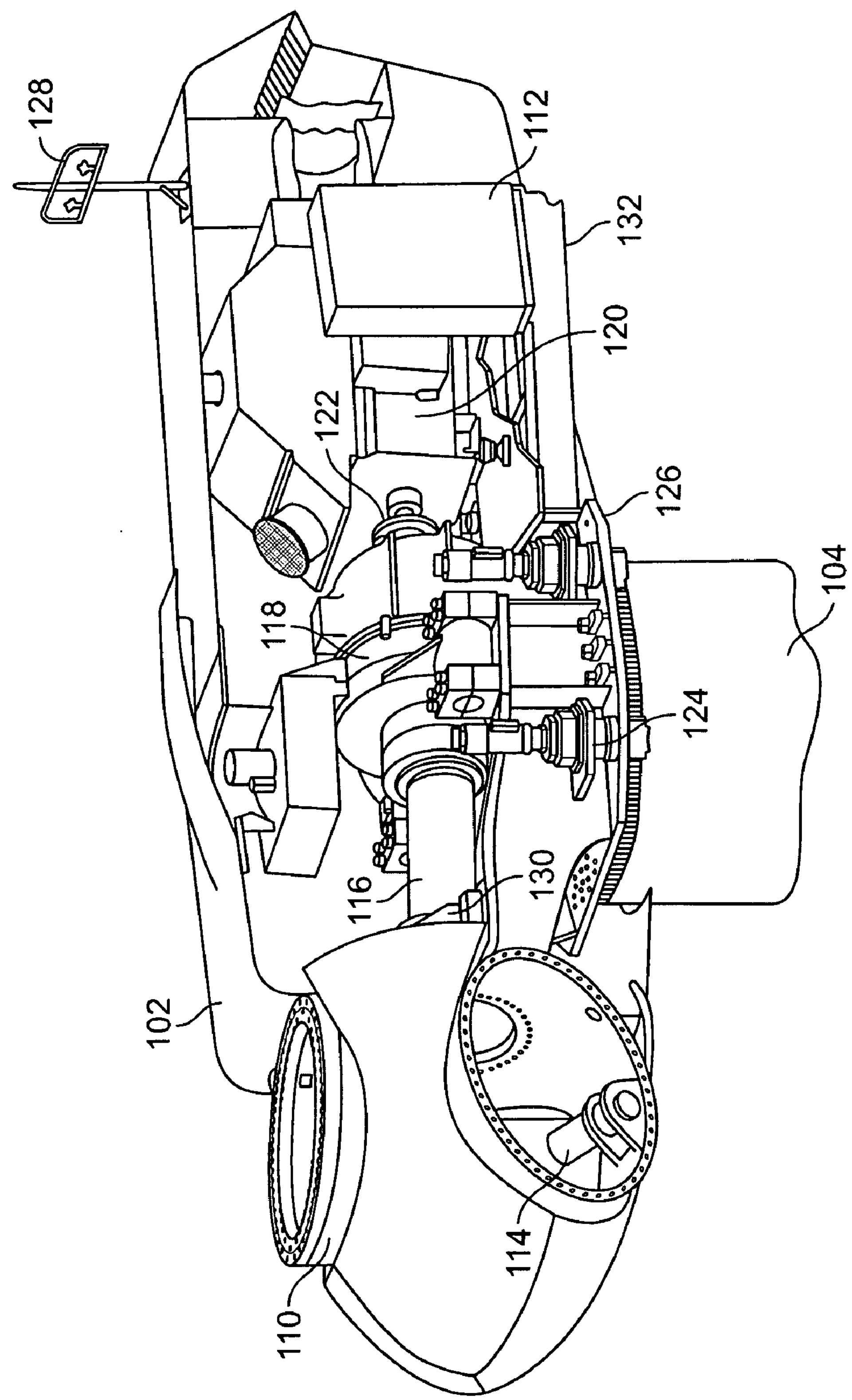
FIG. 2 is a cut-away perspective view of a nacelle of the exemplary wind turbine unit configuration shown in FIG. 1.

In some configurations and referring to FIG. 2, various components are housed in nacelle 102 atop tower 104 of wind turbine unit 100. The height of tower 104 is selected based upon factors and conditions known in the art. In some configurations, one or more microcontrollers within control panel 112 comprise a control system used for overall system monitoring and control including pitch and speed regulation, high-speed shaft and yaw brake application, yaw and pump motor application and fault monitoring. Alternative distributed or centralized control architectures are used in some configurations. In some, but not all configurations of the present invention, the wind turbine unit control system in control panel 112 also monitors and adjusts current applied to an impressed current anode (not shown in FIG. 1) in accordance with changing corrosiveness conditions affecting the support structure or foundation. In some other configurations, a transformer/rectifier (T/R) is used with an embedded controller, as explained in more detail elsewhere in this description.

In some configurations, the control system provides control signals to a variable blade pitch drive 114 to control the pitch of blades 108 (not shown in FIG. 2) that drive hub 110 as a result of wind. In some configurations, hub 110 receives three blades 108, but other configurations can utilize any number of blades. In some configurations, the pitches of blades 108 are individually controlled by blade pitch drive 114. Hub 110 and blades 108 together comprise wind turbine rotor 106.

The drive train of the wind turbine unit includes a main rotor shaft 116 (also referred to as a "low speed shaft") connected to hub 110 via main bearing 130 and (in some configurations), at an opposite end of shaft 116 to a gear box 118. Gear box 118, in some configurations, utilizes a dual path geometry to drive an enclosed high speed shaft. In other configurations, main rotor shaft 116 is coupled directly to generator 120. The high speed shaft (not shown in FIG. 2) is used to drive generator 120, which is mounted on main frame 132. In some configurations, rotor torque is transmitted via coupling 122. Generator 120 may be of any suitable type, for example and without limitation, a wound rotor induction generator or a direct drive permanent magnet generator.

Yaw drive 124 and yaw deck 126 provide a yaw orientation system for wind turbine unit 100. Meteorological boom 128 provides information for turbine unit control system 300 of FIG. 3, including wind direction and/or wind speed. In some configurations, the yaw system is mounted on a flange provided atop tower 104.

Figure 3:
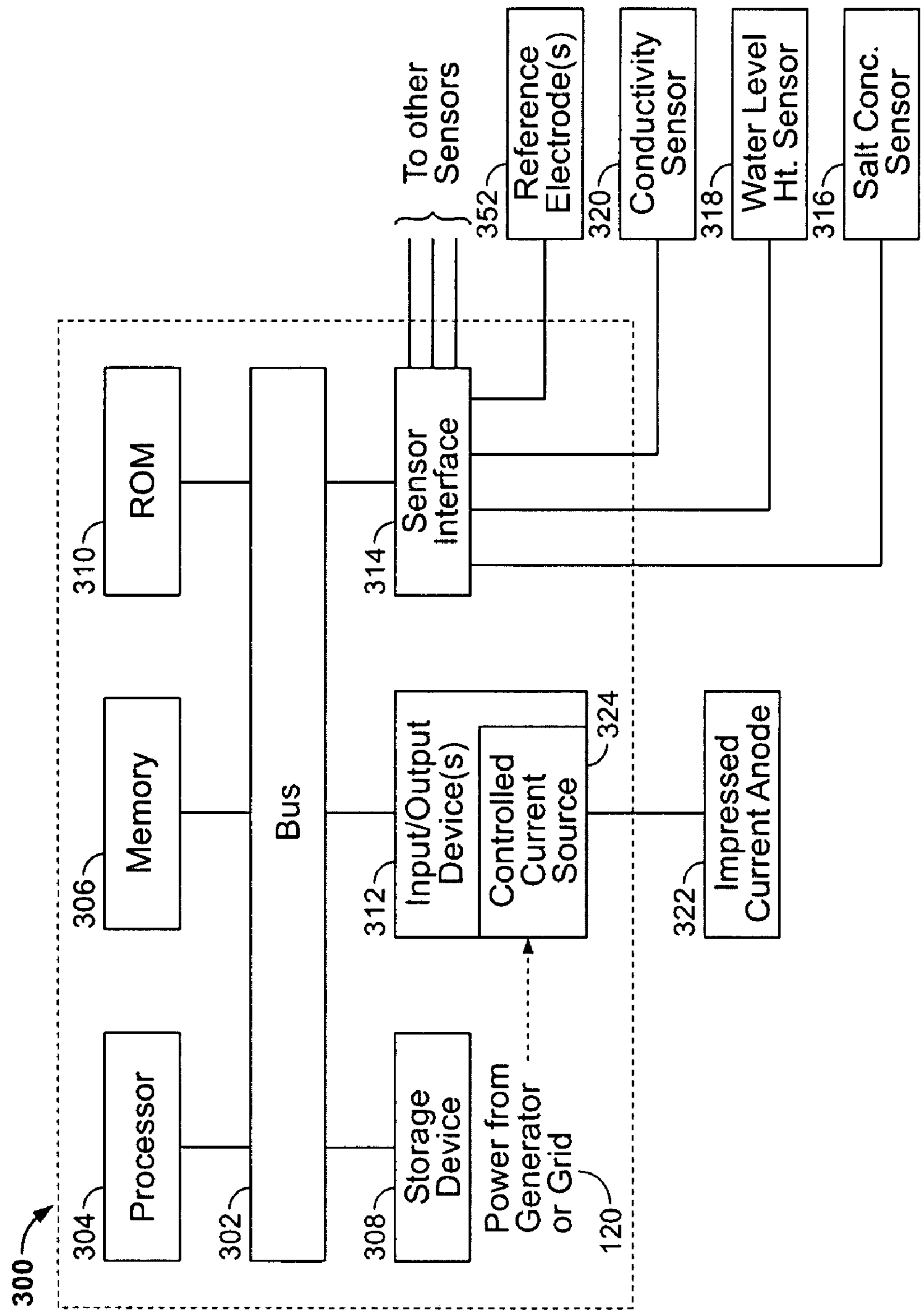
FIG. 3 is a block diagram of an exemplary configuration of a control system for the wind turbine unit configuration shown in FIG. 1.

In some configurations and referring to FIG. 3, a wind turbine unit control system 300 mounted in box 112 for wind turbine unit 100 includes a bus 302 or other communications device to communicate information. Processor(s) 304 are coupled to bus 302 to process information, including information from sensors configured to measure displacements or moments. Control system 300 further includes random access memory (RAM) 306 and/or other storage device(s) 308. RAM 306 and storage device(s) 308 are coupled to bus 302 to store and transfer information and instructions to be executed by processor(s) 304. RAM 306 (and also storage device(s) 308, if required) can also be used to store temporary variables or other intermediate information during execution of instructions by processor(s) 304. Control system 300 can also include read only memory (ROM) and or other static storage device 310, which is coupled to bus 302 to store and provide static (i.e., non-changing) information and instructions to processor(s) 304. Input/output device(s) 312 can include any device known in the art to provide input data to control system 300 and to provide yaw control and pitch control outputs. Instructions are provided to memory from a storage device, such as magnetic disk, a read-only memory (ROM) integrated circuit, CD-ROM, DVD, via a remote connection that is either wired or wireless providing access to one or more electronically-accessible media, etc. In some embodiments, hard-wired circuitry can be used in place of or in combination with software instructions. Thus, execution of sequences of instructions is not limited to any specific combination of hardware circuitry and software instructions. Sensor interface 314 is an interface that allows control system 300 to communicate with one or more sensors. Sensor interface 314 can be or can comprise, for example, one or more analog-to-digital converters that convert analog signals into digital signals that can be used by processor(s) 304. The sensors can include, for example, salt concentration sensors 316, water level height sensors 318, and/or conductivity sensors 320 that are configured to detect corrosiveness conditions around the support structure or foundation, and/or other sensors such as reference electrodes 352. Sensors 316, 318, and 320 can, for example, be mounted under or near the surface of the water surrounding the support structure or foundation, as appropriate the individual sensor type. Sensors 316, 318, and/or 320, in configurations in which they are provided and used, can provide input to processor 304 (or to a separate controller, as described below in connection with FIG. 4) to determine a voltage and/or current to provide to an impressed current anode 322 electrochemically coupled to the support structure or foundation. In particular, output devices 312 can include a variable DC regulator connected to impressed current anode and/or the support structure or foundation to provide the voltage and/or current determined by processor 304 between the support structure or foundation and impressed current anode 322. The power source for the variable DC regulator can be generator 120 itself and/or the power grid to which it is connected. In some configurations in which one or more reference electrodes 352 are used (including those in which they are used as the only sensors), reference electrodes 352 are located under the surface of the water near wind turbine unit 100, and are used to measure a potential difference or differences between wind turbine unit 100 (or more precisely, its support structure or foundation) and reference electrodes 352 relative to a standard electrode potential or setpoint. The current supplied to impressed current anode 322 is adjusted in accordance with this difference.

Figure 4:
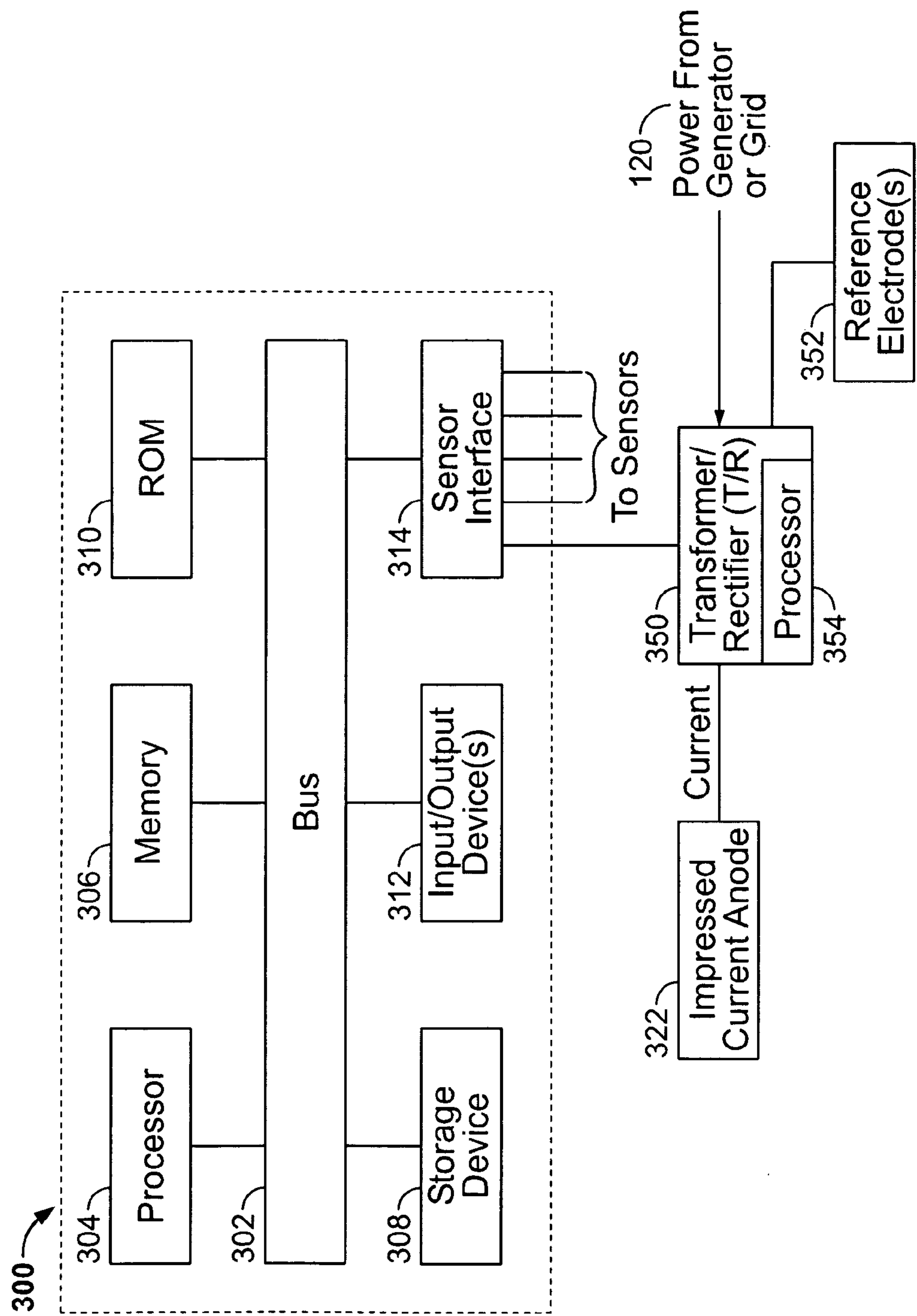
FIG. 4 is a drawing of a plurality of wind turbine units of FIG. 1 on support structures or foundations installed in a representative marine environment protected from corrosion by a configuration of an impressed current cathodic protection (ICCP) system.

In some configurations and referring to FIG. 4, a transformer/rectifier (T/R) 350 with an embedded processor 354 controls the amount of current (or the potential difference of wind turbine unit 100) through impressed current anode 322 via reference electrodes 352 in water near wind turbine unit 100. A voltage potential difference is measured between reference electrodes 352 and wind turbine unit 100. T/R 350 adjusts current to control the measured potential difference or differences, based upon a standard electrode potential or setpoint. In some configurations, a wind turbine unit controller 300 in control panel 112 monitors the health of the ICCP system (including, in some configurations, T/R 350, anode 322, and/or reference electrodes 352) and provides an alarm if any or all of certain parameters (e.g., the amount of current needed to adjust the potential difference) are exceeded. In such configurations, the ICCP system is able to operate independently of the wind turbine unit controller, and will operate as long as power is provided.

Figure 5:
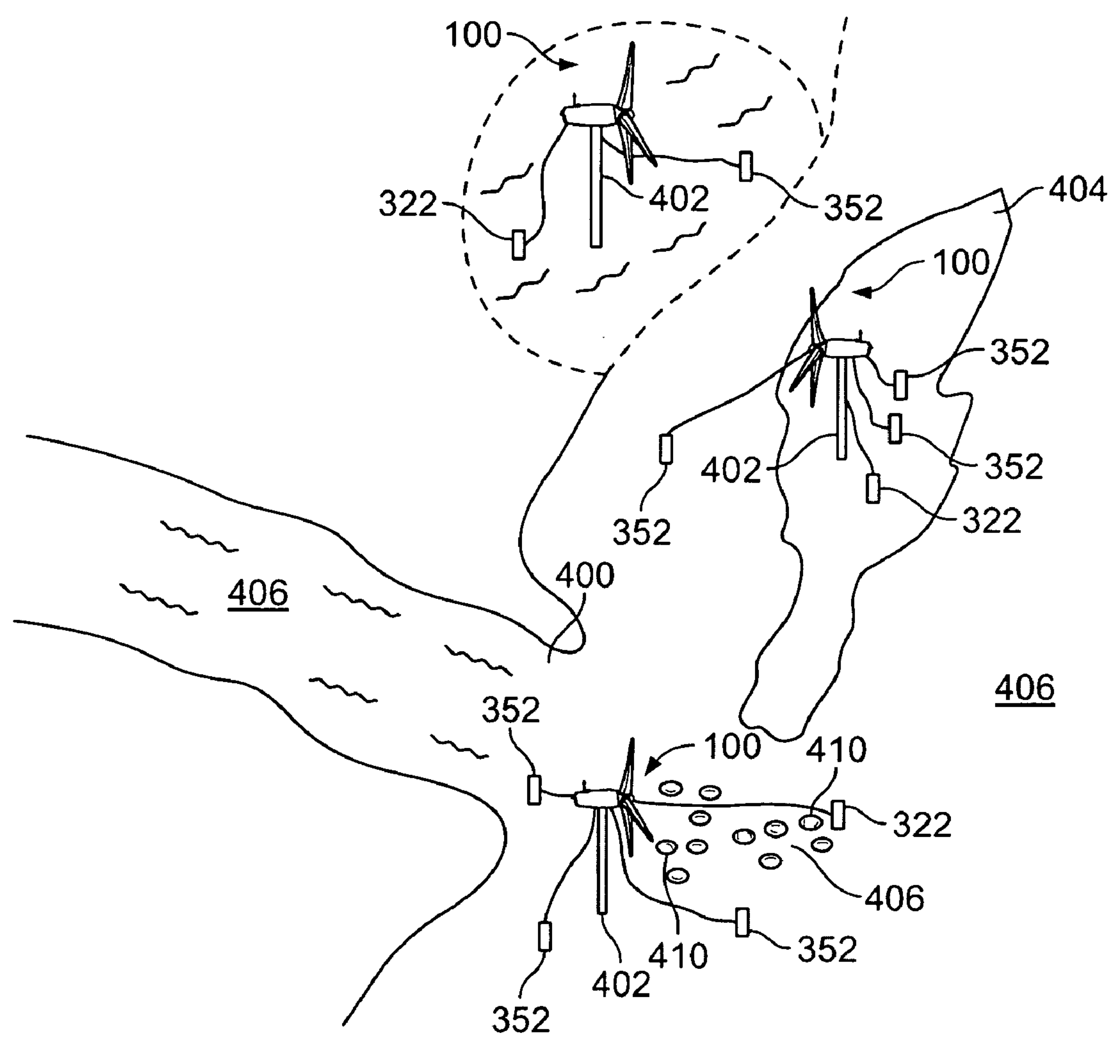
FIG. 5 shows the wind park.

Some configurations of the present invention take advantage of the flexibility of an ICCP system to adapt to changing conditions throughout the 20–25 year lifetime of turbine unit 100. For example, and referring to FIG. 5, at river outlets 400 to an ocean, water salinity may change on a daily basis with the tide. Sacrificial anodes often become passivated in such conditions, but ICCP anodes 322 can be controlled by electrical currents so that they do not suffer from this condition. In some installations, a wind turbine unit support structure or foundation 402 is located on a sand bar 404, where sands shift significantly throughout the year, and strong currents are typical. In these installations, some configurations control ICCP anodes by adjusting current supply in accordance with the changing conditions to keep wind turbine unit support structures or foundations 402 protected. Sacrificial anodes, by contrast, cannot adjust and would be subject to premature consumption or to underprotection.

In some configurations, a single ICCP (i.e, impressed current) anode 322 can provide protection to a plurality of wind turbine units 100 on support structures or foundations 402 that would ordinarily be provided by a plurality of sacrificial anodes.

Wind turbine unit support structures or foundations may be towers 104 each supporting a single wind turbine unit 100 or, in some configurations, support structures or foundations similar to oil drilling support structures or foundations, but with one or more wind turbine units 100 being supported thereon. Other support structures are not excluded by the present invention.

Thus, in some configurations of the present invention, a corrosion protected wind turbine unit 100 is provided that includes a wind turbine unit support structure or foundation 402 implanted in water 406. An impressed current anode 322 is also provided. Anode 322 is electrochemically coupled to wind turbine unit support structure or foundation 402 through water 406. By “electrochemically coupled,” what is meant is that a liquid pathway 408 for movement of charged ions 410 exists between wind turbine unit support structure or foundation 402 and the impressed current anode 322 so that anode 322 can protect wind turbine unit support structure or foundation 402 from corrosion. “Liquid” here is intended to include not only flowing or stagnant water, but also wet sand, mud, and other water-containing mixtures, including such mixtures covered with dry earth or sand. Thus, wind turbine unit support structure or foundation 402 can be located in a region of shifting bathymetry, in shallow water (i.e., in ten feet or less of water), or on a sand bar. The wind turbine unit also includes a controlled current source 324 configured to receive a portion of the electrical current from wind turbine unit 100 or at least one other wind turbine unit 100 located in proximity to the corrosion protected wind turbine unit (i.e., on the same or a nearby or adjacent support structure or foundation) and further configured to operate impressed current anode 322. In some other configurations, controlled current source 324 is separate from wind turbine unit 100, and may be included in a separate transformer/rectifier 350, or provided as a stand-alone component. Moreover, in some configurations, a UPS (Uninterruptible Power Supply) backup battery pack (not shown) associated with a wind turbine unit 100 is supplied for times when wind turbine units 100 cannot generate power, for example, either as a result of insufficient wind, during initial installation before start-up, or during unit shut-downs such as those due to safety controls, maintenance or system breakdown. The ICCP requires little power, and can continue operating with UPS-supplied electrical power for extended periods, if necessary.

In some configurations, a wind turbine unit controller 300 and/or a separate T/R 350 is provided that is configured to monitor and adjust current applied to impressed current anode 322 in accordance with changing corrosiveness conditions, which may include but are not limited to, for example, changing potentials between one or more reference electrodes 352 and wind turbine unit 100 and/or changing salinity conditions. Wind turbine unit controller 300 is located on or in the wind turbine unit 100, or on another nearby wind turbine unit.

Also, in some configurations of the present invention, a method for protecting wind turbine unit support structure or foundation 402 from corrosion is provided that includes providing an impressed current anode 322 electrochemically coupled to wind turbine unit support structure or foundation 402. Wind turbine unit support structure or foundation 402 can be located in a region of shifting bathymetry, in shallow water (i.e., in ten feet or less of water), or on a sand bar.

Some configurations further include applying a current obtained from at least one wind turbine unit on the wind turbine unit support structure or foundation to the impressed current anode to operate the impressed current anode.

It will thus be appreciated that various configurations of the present invention are capable of adapting to changing conditions throughout an expected 20–25 year lifetime of a wind turbine unit, or perhaps longer. For example, if wind turbine units are located close to the outlet of a river to the ocean, salinity may change on a daily basis with the tide. Various configurations of the present invention can function in either fresh or salt water, whereas salt water anodes cannot function in fresh water. Sacrificial anodes tend to passivate in salt water, as opposed to impressed current anodes of the present invention. Moreover, configurations of the present invention can be incorporated into standard designs for a wide range of environmental conditions (salinity, water temperature, water depth, current speed, sand bar activity, etc.) whereas sacrificial anodes must be specifically engineered for each site, and possibly for each wind turbine unit. Hence, configurations of the present invention can eliminate re-engineering costs with each new site.

Furthermore, configurations of the present invention can be built much lighter than sacrificial anode systems. The much lighter weights do not require that stronger support structures be designed and built. The use of standard support structures and a light-weight protection system makes it more practical to install configurations of the present invention at windy offshore sites that have a short installation and construction season. Thus, initial corrosion of support structures is less unlike to occur. Also, the lighter weights make configurations of the present invention easier to install than sacrificial anode systems.

The release of hazardous minor metal components, as occurs in sacrificial anodes, does not occur or is easily prevented with configurations of the present invention. In addition, although configurations of the present invention require a small, continuous energy consumption, their much increased efficiency compared to sacrificial anode systems results in a lower total energy consumption than is required for manufacturing the much heavier sacrificial anodes.

Although various configurations of the present invention are described in conjunction with installations in shallow water, configurations of the present invention can also be used in medium or deep water, at all depths.

While the invention has been described in terms of various specific embodiments, those skilled in the art will recognize that the invention can be practiced with modification within the spirit and scope of the claims.

What is claimed is:

1. A method for protecting a wind turbine unit support structure or foundation from corrosion, said method comprising:

providing an impressed current anode electrochemically coupled to the wind turbine unit support structure or foundation; and applying a current obtained from at least one wind turbine unit on the wind turbine unit support structure or foundation, a current obtained from a power supply coupled to the at least one wind turbine unit, to the impressed current anode to operate the impressed current anode.

2. A method in accordance with claim 1 wherein the wind turbine unit support structure or foundation is located in a region of shifting bathymetry.

3. A method in accordance with claim 1 wherein the wind turbine unit support structure or foundation is located in shallow water.

4. A method in accordance with claim 1 wherein the wind turbine unit support structure or foundation is located on a sand bar.

5. A method in accordance with claim 1 further comprising utilizing at least one of a wind turbine unit controller or a transformer/rectifier to monitor and adjust current applied to the impressed current anode in accordance with changing corrosiveness conditions.

6. A method in accordance with claim 1 wherein a plurality of wind turbine units support structures or foundations are electrochemically coupled to a single impressed current anode and said single impressed current anode is used to protect the plurality of wind turbine unit support structures or foundations.

7. A method in accordance with claim 2 wherein a plurality of wind turbine units support structures or foundations are electrochemically coupled to a single impressed current anode and said single impressed current anode is used to protect the plurality of wind turbine unit support structures or foundations.

8. A method in accordance with claim 3 wherein a plurality of wind turbine units support structures or foundations are electrochemically coupled to a single impressed current anode and said single impressed current anode is used to protect the plurality of wind turbine unit support structures or foundations.

9. A method in accordance with claim 4 wherein a plurality of wind turbine units support structures or foundations are electrochemically coupled to a single impressed current anode and said single impressed current anode is used to protect the plurality of wind turbine unit support structures or foundations.

10. A method in accordance with claim 5 wherein a plurality of wind turbine units support structures or foundations are electrochemically coupled to a single impressed current anode and said single impressed current anode is used to protect the plurality of wind turbine unit support structures or foundations.

* * * * *